US009020175B2

(12) United States Patent
Hawker et al.

(10) Patent No.: US 9,020,175 B2
(45) Date of Patent: Apr. 28, 2015

(54) PORTABLE ELECTRONIC DEVICE WHICH PROVIDES HEARING AID COMPATIBILITY

(75) Inventors: Larry Edward Hawker, Waterloo (CA); Christian Lorenz, Waterloo (CA)

(73) Assignee: BlackBerry Limited, Waterloo (CA)

( * ) Notice: Subject to any disclaimer, the term of this patent is extended or adjusted under 35 U.S.C. 154(b) by 537 days.

(21) Appl. No.: 13/327,834

(22) Filed: Dec. 16, 2011

(65) Prior Publication Data

US 2012/0155682 A1   Jun. 21, 2012

Related U.S. Application Data

(60) Provisional application No. 61/424,177, filed on Dec. 17, 2010.

(51) Int. Cl.
*H04R 25/00* (2006.01)
*H04M 1/725* (2006.01)
*H04M 1/02* (2006.01)
*H04M 1/03* (2006.01)

(52) U.S. Cl.
CPC ........ *H04M 1/72591* (2013.01); *H04M 1/0277* (2013.01); *H04M 1/03* (2013.01); *H04R 25/554* (2013.01)

(58) Field of Classification Search
CPC .... H04R 11/00; H04R 17/00; H04R 2225/41; H04R 2225/51; H04R 2225/61; H04R 2225/67; H04R 2460/13; H04R 25/43; H04R 25/356; H04R 25/505; H04R 25/554; H04R 25/558; H04R 25/606; H04R 25/70
USPC .................. 381/326, 331, 312, 324, 380, 386
See application file for complete search history.

(56) References Cited

U.S. PATENT DOCUMENTS

| | | | |
|---|---|---|---|
| 6,622,815 B2 * | 9/2003 | Kolpe et al. ................... 381/324 |
| 6,958,684 B2 | 10/2005 | Lin et al. | |
| 7,418,106 B2 | 8/2008 | Greuet et al. | |
| 2005/0281425 A1 | 12/2005 | Greuet et al. | |
| 2007/0229369 A1 * | 10/2007 | Platz ............................. 343/702 |
| 2008/0021525 A1 * | 1/2008 | Solzbacher et al. ............ 607/61 |
| 2008/0056519 A1 | 3/2008 | Jung | |
| 2008/0056521 A1 | 3/2008 | Phillips | |
| 2009/0074226 A1 | 3/2009 | Eaton et al. | |
| 2009/0143097 A1 * | 6/2009 | Wilson ........................ 455/556.1 |
| 2009/0186653 A1 | 7/2009 | Drader et al. | |
| 2010/0136905 A1 | 6/2010 | Kristiansen | |
| 2010/0237976 A1 * | 9/2010 | Li et al. ......................... 381/331 |

FOREIGN PATENT DOCUMENTS

| | | |
|---|---|---|
| CA | 2743699 | 6/2011 |
| DE | 43 06 416 A1 | 9/1994 |
| EP | 2397973 | 12/2011 |

OTHER PUBLICATIONS

Extended European Search Report; EP 11193921.1; Feb. 6, 2013.
CA Application No. 2,762,403; Office Action dated Feb. 3, 2014.
Communication Pursuant to Article 94(4) EPC; EP 11193921.1; Aug. 27, 2014.

* cited by examiner

*Primary Examiner* — Brian Ensey
(74) *Attorney, Agent, or Firm* — Ridout & Maybee LLP

(57) ABSTRACT

A portable electronic device which provides hearing aid compatibility and a printed circuit board (PCB) for use in a portable electronic device are provided. The PCB comprises a body having at least one signal trace, a hearing aid compatibility (HAC) coil located in the body and electrically coupled to the at least one signal trace, and a ferrite core located in the body for amplifying a magnetic field generated by the HAC coil.

28 Claims, 4 Drawing Sheets

PORTABLE ELECTRONIC DEVICE WHICH PROVIDES HEARING AID COMPATIBILITY

RELATED APPLICATION DATA

The present application claims priority to and the benefit of U.S. provisional patent application Ser. No. 61/424,177, filed Dec. 17, 2010, the content of which is incorporated herein by reference.

TECHNICAL FIELD

The present disclosure relates to portable electronic devices, and in particular to a portable electronic device which provides hearing aid compatibility (HAC).

BACKGROUND

In general, hearing aid compatibility or HAC is directed to making devices such as telephones, which supply a conventional acoustic signal, compatible for use with devices that assist hearing, such as hearing aids. HAC involves generating a magnetic audio signal (which itself is not audible) from or near the earpiece area of a mobile telephone. The magnetic signal may be generated in addition to or instead of a conventional acoustic audio signal (which is audible). The magnetic signal is received by a receiving coil within the hearing aid. The receiving coil may be a telecoil (or T-coil). The hearing aid converts the magnetic signal received by the receiving coil into an acoustic signal. This acoustic signal, when emitted in the ear channel of a user, allows a hearing aid wearer to hear audio output from the telephone.

DETAILED DESCRIPTION OF EXAMPLE EMBODIMENTS

Figure 1:
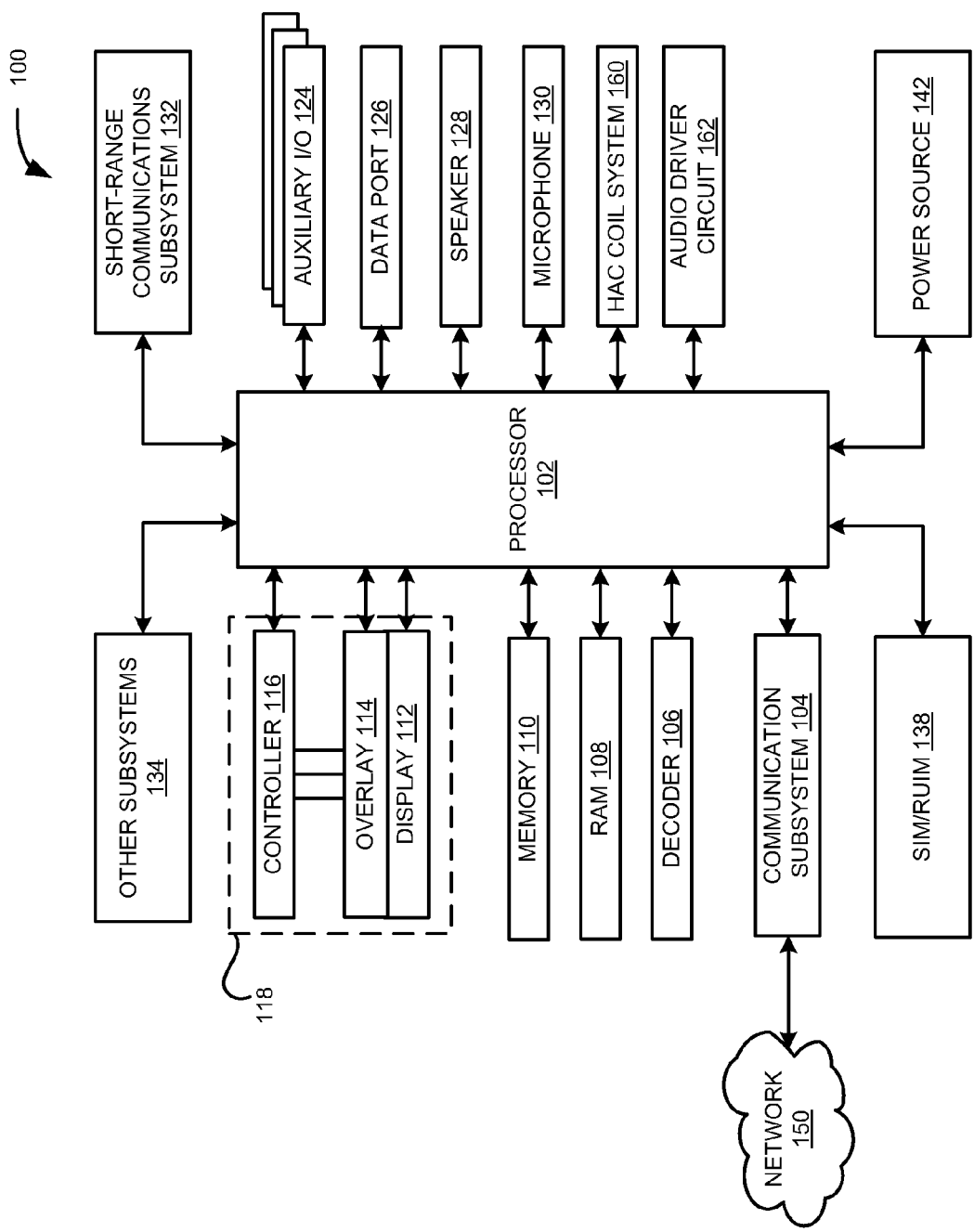
FIG. 1 is a simplified block diagram of components of a portable electronic device in accordance with one example embodiment of the present disclosure.

The concepts described herein are directed to portable electronic devices, such as cellular telephones or smart phones, which are hearing aid compatible. Hearing aid compatibility generally provides benefits for hearing aid users, such as less interference and acoustic feedback. In many implementations, HAC provides a message that is more audible to a hearing aid wearer than a message that is audibly produced by the telephone earpiece and then processed by the hearing aid.

Within a portable electronic device such as a mobile telephone, the magnetic audio signal is typically generated by an inductor known as a HAC coil. The HAC coils are conventionally surface mounted to the printed circuit board (PCB) of the mobile telephone. Surface-mounted HAC coils occupy space on the PCB, and may affect the location of other components. Described herein is apparatus (including a description of construction of the apparatus) that may provide benefits over surface-mounted coils.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The present disclosure describes a hearing aid compatible portable electronic device. The portable electronic device comprises a HAC coil which generates a magnetic field containing an audio signal. The HAC coil is provided in a circuit carrying element such as a PCB of the portable electronic device, thereby increasing the surface on the PCB available for mounting other components. The incorporation of the HAC coil in the PCB may also provide more space above the PCB surface for other features not specifically mounted to the PCB such as stiffening ribs in the plastics, other device components like a camera module on a flexible PCB, among other features. The HAC coil may be positioned in the PCB to improve the quality of the generated magnetic field. A ferrite core may also be provided to amplify the magnetic field.

In accordance with one embodiment of the present disclosure, there is provided a PCB for use in a portable electronic device. The PCB comprises a body having at least one signal trace, a HAC coil located in the body and electrically coupled to the at least one signal trace, and a ferrite core located in the body for amplifying a magnetic field generated by the HAC coil. Further details of example embodiments are set forth below.

For example, in some embodiments, the body of the PCB is comprised of multiple layers and the HAC coil comprises one or more traces formed on one or more of the multiple layers of the body. The ferrite core may comprise a ferrite film formed on one or more of the multiple layers of the body. The ferrite core may have a cross-sectional area which is substantially the same or larger than a cross-sectional area of HAC coil. The ferrite core and HAC coil may each have a cross-sectional area of approximately 4 mm. The ferrite core and HAC coil each have a cross-sectional area which spans a majority of the PCB. In other embodiments, the HAC coil may be a conventional HAC coil. The body may be comprised of multiple layers and the ferrite core comprises a ferrite film formed on one or more of the multiple layers of the body, The ferrite core may be a ceramic material having a cubic crystalline structure with the chemical formula $MO \cdot Fe_2O_3$ where MO refers to a combination of two or more divalent In accordance with another embodiment of the present disclosure, there is provided a PCB which comprises a body comprised of multiple layers having at least one signal trace located on one of the multiple layers, a HAC coil comprising one or more traces formed on one or more of the multiple layers of the body, and a speaker mounted to a surface of the body. The HAC coil is located centrally below the speaker. The ferrite core may be a ceramic material having a cubic crystalline structure with the chemical formula MO.Fe2O3 where MO refers to a combination of two or more divalent In accordance with a further embodiment of the present disclosure, there is provided a PCB which comprises a body comprised of multiple layers having at least one signal trace located on one of the multiple layers, a HAC coil comprising one or more traces formed on one or more of the multiple layers of the body, and a speaker mounted to a surface of the body in the centre of the PCB. The ferrite core may be a ceramic material having a cubic crystalline structure with the chemical formula MO.Fe2O3 where MO refers to a combination of two or more divalent In accordance with yet a further embodiment of the present disclosure, there is provided a portable electronic device. The portable electronic device comprises a PCB having a HAC coil as described above, a processor, input device and an output device each electrically coupled to the PCB. The ferrite core may be a ceramic material having a cubic crystalline structure with the chemical formula MO.Fe2O3 where MO refers to a combination of two or more divalent In accordance with yet a further embodiment of the present disclosure, there is provided a method, comprising: forming a printed circuit board from an assembly of layers of dielectric material, the printed circuit board defining a cavity; and embedding a hearing aid compatibility (HAC) coil and a ferrite core in the cavity. The ferrite core may be a ceramic material having a cubic crystalline structure with the chemical formula MO.Fe2O3 where MO refers to a combination of two or more divalent The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, PDAs, wirelessly enabled notebook computers, tablet computing devices, and so forth. The portable electronic device may also be a portable electronic device with or without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 (such as a liquid crystal display (LCD)) with a touch-sensitive overlay 114 operably coupled to an electronic controller 116 that together comprise a touch-sensitive display 118, one or more auxiliary input/output (I/O) subsystems 124, a data port 126, a speaker (also known as a receiver transducer) 128, a microphone 130, short-range communications subsystem 132, other device subsystems 134, a HAC coil system 160 and an audio drive circuit 162 for driving the HAC coil system 160 and possibly the speaker 128. User-interaction with a graphical user interface (GUI) is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device 100, is displayed on the touch-sensitive display 118 via the processor 102.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software applications or programs 148 that are executed by the processor 102 and are typically stored in a persistent, updatable store such as the memory 110. Additional applications or programs 148 may be loaded onto the portable electronic device 100 through the wireless network 150, the auxiliary I/O subsystem 124, the data port 126, the short-range communications subsystem 132 or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

Figure 2:
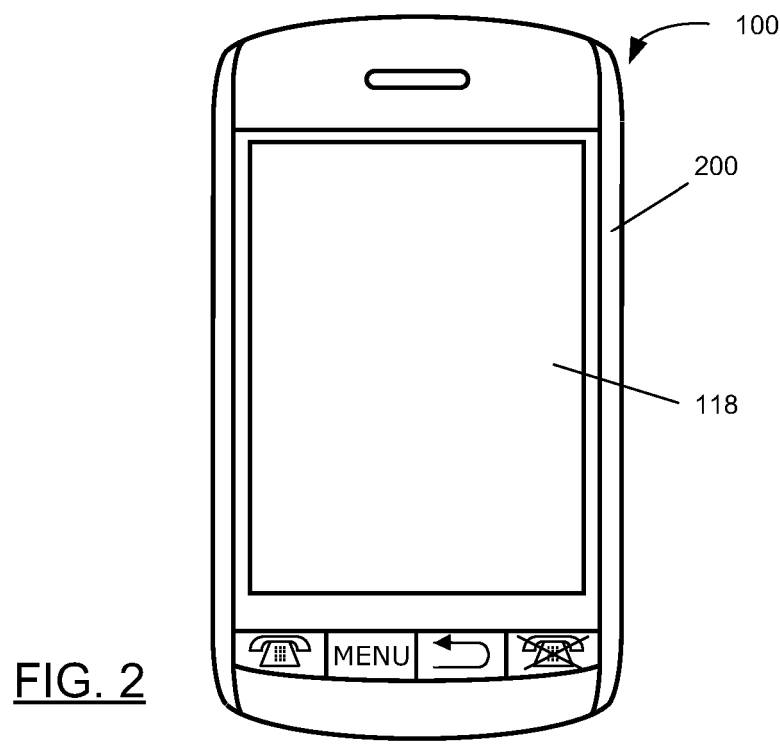
FIG. 2 is a front view of an example of a portable electronic device in a portrait orientation.

FIG. 2 shows a front view of an example of a portable electronic device 100 in portrait orientation. The portable electronic device 100 includes a housing 200 that houses internal components including internal components shown in FIG. 1 and frames the touch-sensitive display 118 such that the touch-sensitive display 118 is exposed for user-interaction therewith when the portable electronic device 100 is in use. It will be appreciated that the touch-sensitive display 118 may include any suitable number of user-selectable features rendered thereon, for example, in the form of virtual buttons for user-selection of, for example, applications, options, or keys of a keyboard for user entry of data during operation of the portable electronic device 100. While the shown portable electronic device 100 is a "bar" or "brick" style device, the present disclosure is intended to capture all types of form factors including, but not limited to, slider-style and flip-style devices.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or, other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a centre of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected. The centre of the area of contact of each touch is commonly referred to as the touch point or centroid. It will be appreciated that during a touch event the touch point moves as the object detected by the touch-sensitive display 118 moves.

The auxiliary I/O subsystems 124 could include other input devices such as one or more control keys, a keyboard or keypad, navigation device, or any combination thereof. The navigation device may be a depressible/clickable trackball, a depressible/clickable scroll wheel, a touch-sensitive optical trackpad, or a touch-sensitive touchpad.

In other embodiments, a conventional display such as an LCD may be provided instead of the touch-sensitive display 118. In such embodiments, input may be provided via one or more control keys, a keyboard or keypad, navigation device, or any combination thereof.

Figure 3A:
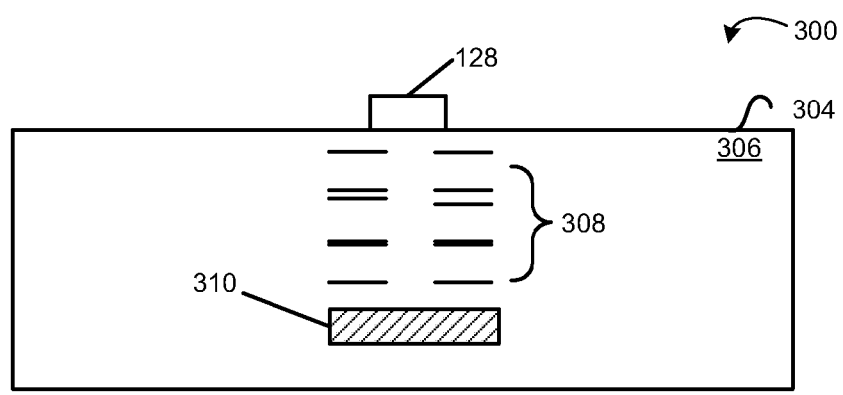
FIG. 3A is a sectional side view of a printed circuit board for the portable electronic device of FIG. 1 in accordance with one example embodiment of the present disclosure.
Figure 3B:
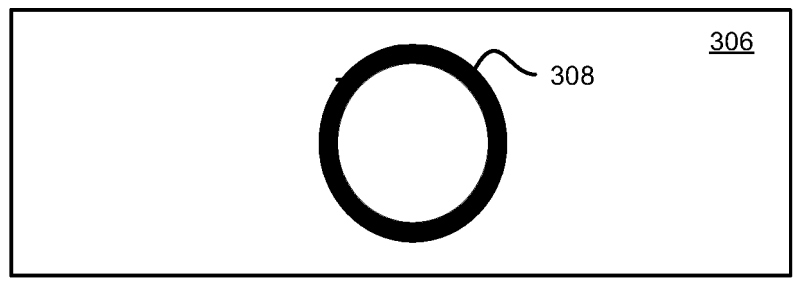
FIG. 3B is a sectional top view of the printed circuit board of FIG. 3A showing a HAC coil trace.

Referring now to FIGS. 3A and 3B, one example embodiment of a HAC coil system 300 for the portable electronic device 100 in accordance with the present disclosure will be described. The portable electronic device 100 includes a circuit carrying element such as a PCB 304 having a body 306. The PCB 304 may be a rigid PCB or a flexible PCB supported by a stiffener. The PCB 304 is an assembly of multiple layers of a dielectric material (i.e., non-conductive material) in a stack. Each layer in the stack is typically formed by a dielectric polymer such as, for example, a polyimide polymer. Traces, such as signal traces, power traces and ground traces, are formed on various layers of the PCB 304 and are separated by the dielectric material. The traces of the PCB 304 are formed by a thin conductive foil patterned onto a dielectric substrate (e.g., a sheet of the dielectric polymer). Each trace is formed in a desired circuit pattern using, for example, conventional photolithography (or masking) and etching techniques. The conductive foil is typically copper, although other conductive materials may be used.

The layers of the PCB 304 form a stackup configuration which typically comprises alternating core layers and prepreg layers which are laminated together. Core layers are thin layers of dielectric substrate having a trace patterned on one or both sides. The dielectric substrate in the core layers is typically a cured fibreglass-epoxy resin. The prepreg layers are thin layers of the dielectric substrate which do not have any traces. The dielectric substrate in the prepreg layers is typically an uncured fibreglass-epoxy resin.

The speaker 128, in the shown embodiment, is surface mounted (with respect to the PCB 304) and is electrically coupled to one or more signal traces (not shown) on the top surface of the body 306. In this way, the speaker 128 is electrically coupled to other electronic components that are physically connected to the PCB 304. As used herein, components are electrically coupled when an electrical signal (such as a voltage or a modulated current) can be conveyed from one component via one or more conductors to another component. As used herein, components are not electrically coupled if they convey electric signals to one another wirelessly without physical conductors, such as by induction.

In other embodiments, the speaker 128 may be electrically coupled to a flexible PCB which connects to the PCB 304. The speaker 128 includes an electric-to-acoustic transducer (not shown) which converts electric audio signals received from the processor 102 into acoustic audio signals. The acoustic audio signals generated by the speaker 128 are transmitted through an opening in the housing 200 of the portable electronic device 100 to the outside environment using, for example, a speaker boot or acoustic port. The speaker 128 may include a shield can (or casing) that may be used to enhance the frequency response of the acoustic system and decrease the distortion caused by magnetic fields being received or transmitted from electrical components.

The speaker 128 may be a conventional speaker which includes a diaphragm connected to a rigid frame via a flexible suspension that constrains a voice coil adapted to move axially through a magnetic gap of suitable shape. When an electrical signal is applied to the voice coil, a magnetic field is generated by the electric current in the voice coil. The magnetic field generated by the voice coil interacts with the cylindrical magnetic gap, causing the voice coil and diaphragm to move back and forth. The movement of the diaphragm causes the acoustic or audible signal, thereby reproducing sound under the control of the electrical signal.

The speaker 128 may be configured to provide different levels of audible signals for private audible signals (i.e., low volume), non-private audible signals (i.e., high volume) for using the portable electronic device 100 as speakerphone, or both. The auxiliary I/O subsystems 124 may include an audio output port configured to be coupled to an external speaker or headset for use instead of, or in addition to, the speaker 128.

The HAC coil system 300 is provided within the PCB 304 and electrically coupled to one or more internal signal traces (not shown) of the PCB 304. The HAC coil system 300 provides an electric-to-magnetic transducer which provides the functions of a conventional MAC coil. The electric-to-magnetic transducer converts electric audio signals received from the processor 102 into magnetic audio signals which form a varying magnetic field which varies with respect to time. The magnetic audio signals are magnetic representations of an acoustic audio signal corresponding to a voice, music or other audio source. The magnetic audio signals may be received or picked-up by a hearing aid containing a T-coil which is located in sufficient proximity to the HAC coil system 300, such as the example hearing aid 600 show in FIG. 6.

Figure 6:
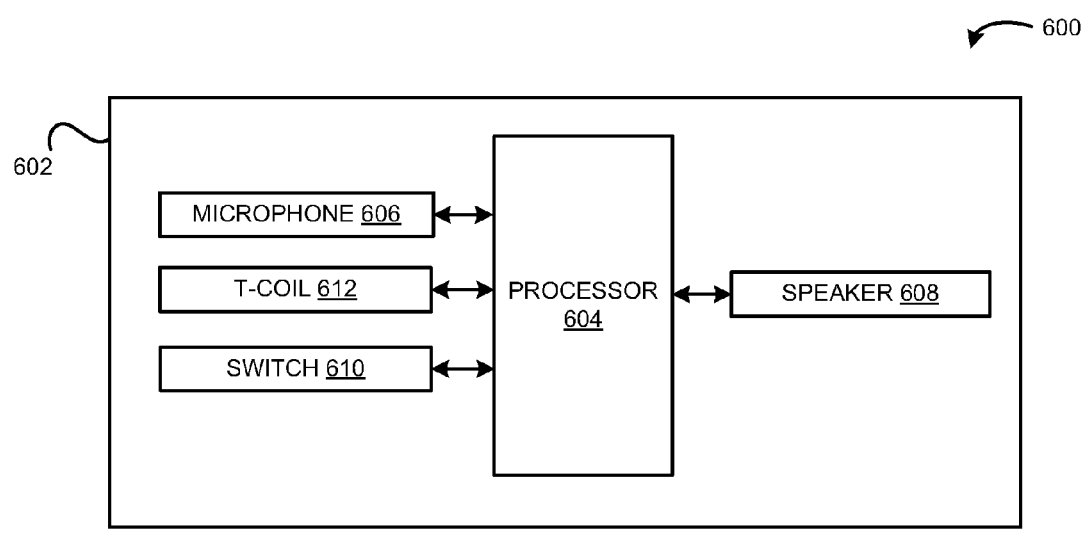
FIG. 6 is a simplified block diagram of components of an example hearing aid suitable for use with the portable electronic device of the present disclosure.

As shown in FIG. 6, the hearing aid 600 is used with the portable electronic device 100 and includes a housing 602, a hearing aid processor 604 carried by the housing 602, and an input transducer such as a microphone 606 connected to the hearing aid processor 604. During normal operation (i.e., when not used with an HAC compliant wireless device such as the portable electronic device 100 phone), audio input received by the microphone 606 is processed and output by the hearing aid processor 604 to an output transducer, such as a speaker 608 for a hearing aid user's ear. The hearing aid 600 also includes a magnetic switch 610 (e.g., a reed switch) and a T-coil 612 to provide HAC operating capabilities. More particularly, the switch 610 is actuated upon being placed in close proximity to a magnetic field generated by an HAC compliant wireless device such as the portable electronic device 100, which causes the hearing aid processor 604 to switch from the microphone 606 to the T-coil 612 as the input source.

When a hearing aid 600 is placed near the portable electronic device 100, for example when a user has the hearing aid 600 placed in his or her ear and the portable electronic device 100 is held close to his or her ear in normal use, a T-coil in the hearing aid 600 receives or picks up (via principles of electromagnetic induction) the magnetic field generated by the HAC coil system 300. The T-coil in the hearing aid 600 then converts the magnetic audio signals into electric audio signals. An electric-to-acoustic transducer in the hearing device converts the electric audio signals into acoustic audio signals. The hearing aid 600 amplifies or otherwise processes the received audio signals to make the audio audible to the user wearing the hearing aid device.

The PCB 304 includes, or has electrically coupled thereto, the audio drive circuit 162 (FIG. 1). The audio drive circuit 162, in some examples, is configured to drive the HAC coil system 300 to provide magnetic audio signals and to drive speaker 128 to generate acoustic audio signals and magnetic signals (if capable). The audio drive circuit 162 may be configured to drive the HAC coil system 300 and speaker 128 in parallel or in series. In other embodiments, the audio drive circuit 162 may be configured to drive the HAC coil system 300 and another audio drive circuit is provided for driving the speaker 128.

In one implementation, the HAC coil system 300 and speaker 128 are driven by the audio drive circuit 162 at substantially the same time such that the magnetic field generated by the speaker 128 and the magnetic field generated by the HAC coil system 300 are both received by a hearing aid device.

The HAC coil system 300 may comprise a single HAC coil or multiple HAC coils 308. A HAC coil system 300 having multiple HAC coils 308 may have the multiple HAC coils 308 arranged such that the magnetic signal produced by the coils is additive. Each HAC coil 308, when driven by the audio drive circuit 162, generates a magnetic field that is hearing aid compatible (HAC) and detectible by a hearing aid device, such as those having a T-coil. The specifications for HAC coils may vary (e.g., from country to country, for time to time, and from device to device). The present disclosure is intended to cover any HAC coil.

The HAC coil(s) 308 may be formed on any suitable internal layer of the PCB 304. Each HAC coil 308 may be formed on a single layer or multiple layers of the PCB 304. The HAC coils 308 are typically formed by printing the HAC coil 308 on the PCB 304. For example, the HAC coils 308 may be formed by copper traces printed (or otherwise formed) on a single layer or multiple layers of the PCB 304. A HAC coil 308 may be formed in a variety of shapes, including a round shape (e.g., circular shape, ovoid shape, etc.), a polygonal shape, a linear shape (e.g., a straight line, a curved line, multiple parallel lines, etc.) or other shape. As best shown in FIG. 3B, in the shown example, the HAC coils 308 are formed in circular shapes on one or more layers of the PCB 304 forming a series of annular HAC coil traces.

For HAC coil systems 300 having multiple HAC coils 308, the HAC coils 308 may be the same or different shapes. The shapes may vary between layers in a multilayer HAC coil system 300. The HAC coils 308 in a multilayer HAC coil system 300 may be arranged such that individual HAC coils 308 overlay one or more other HAC coils 308 in adjacent layers in the PCB 304. HAC coil 308 of a multilayer HAC coil system 300 may be driven by a common drive signal and may be driven in parallel and/or may be driven serially. At least one HAC coil 308 from each layer of a multilayer HAC coil system 300 may be configured such that current flows through those coils in the same direction.

A HAC coil system 300 having multiple HAC coils 308 may include multiple HAC coils 308 arranged on the same layer of the PCB 304. The HAC coils 308 may be arranged on the layer in any suitable configuration. For example, the HAC coils 308 may be arranged such that the HAC coils 308 are adjacent to each other on the layer or may be arranged concentrically.

In other embodiments, the PCB 304 may be substituted for another circuit carrying element in which case the HAC coils 308 are formed using suitable means including, but not limited to, etching the HAC coils 308 out of the circuit carrying element, deposition of the HAC coils 308 on the circuit carrying element, electroplating the HAC coils 308 on the circuit carrying element, or other suitable process for forming current carrying leads on the circuit carrying element.

The HAC coil system 300 also includes a ferrite core 310 which amplifies the magnetic field generated by the HAC coils 308. The ferrite core 310 is a piece of ferromagnetic material with a high magnetic permeability while also having low electrical conductivity. The ferrite core 310 is used to confine and guide magnetic fields. Ferrite core 310 may be a ceramic material having a cubic crystalline structure with the chemical formula $MO.Fe_2O_3$ where MO refers to a combination of two or more divalent metal oxides (e.g. ZnO, NiO, MnO and CuO). The ferrite core 310 amplifies the magnetic field generated by the HAC coil 308 by increasing the induction of the HAC coil 308. The high magnetic permeability relative to the surrounding air causes the magnetic field lines to be concentrated in the core material. The presence of the ferrite core 310 may increase the magnetic field of a coil by a factor of several thousand over what it would be without the core. Other magnetic cores may be used instead of the ferrite core 310 in other embodiments.

In the shown example, the ferrite core 310 is embedded in a cavity (not shown) of the body 306 of the PCB 304. The cavity may be formed in the PCB 304 during the lamination process of its manufacture. To form the cavity, some of the layers of the PCB stackup are formed with holes in the dielectric substrate. The layers are aligned during the lamination process so that holes in adjacent layers are aligned, the holes in the adjacent layers collectively forming the cavity. Alternatively, the cavity may be mechanical drilled using depth controlled drilling techniques, laser drilled or otherwise formed in the surface of the PCB 304.

The ferrite core 310 is located proximate to the HAC coil 308. The ferrite core 310 is generally the same size (e.g., the same cross-sectional area) as the HAC coil 308 in a single coil HAC coil system 300, and generally the same size (e.g., the same cross-sectional area) as the HAC coil system 300 when the HAC coil system 300 has multiple HAC coils 308. The ferrite core 310 may be larger in size than the HAC coil 308 to increase the amplification but is typically not smaller than the HAC coil 308 to increase the amplifying affect. A conventional multi-turn HAC coil 308 is approximately 4 mm. In one embodiment, the HAC coil system 300 and ferrite core 310 are each approximately 4 mm in diameter.

The HAC coil system 300 may be positioned in the PCB 304 proximate to the location of the speaker 128. In the shown example, the speaker 128 is located in the centre of the PCB 304 and the HAC coil system 300 is aligned with the centre of the speaker 128 and located below the speaker 128 in the body 306 of the PCB 304. This allows the magnetic field generated by the HAC coil system 300 to more readily combine with the magnetic field generated by the speaker 128. The HAC coil system 300 (including the coil and ferrite core) is located in the body 306 rather than surface mounted, that is all or a significant portion of the HAC coil system 300 is embedded in the body 306. Generally speaking, a cavity in the PCB 304 receives the components that are located in the body 306. The HAC coil system 300 may be deemed to be located in the body even if the HAC coil system is not completely embedded in the body 306, and may be deemed to be located in the body even if part thereof protrudes from the surface of the PCB 304, and even if one part protrudes more than another.

Positioning the HAC coil system 300 centrally below the speaker 128 also reduces left/right bias. Left bias occurs when the magnetic field generated is stronger on the left of the HAC coil system 300, and right bias occurs when the magnetic field generated is stronger on the right side of the HAC coil system 300. The varying strength of the magnetic field may be due to elements of the HAC coil system 300 being in uneven proximity to the speaker 128. By placing the HAC coil system 300 centrally below the speaker 128, the possibility for notable left/right bias is reduced. The magnetic field generated by the HAC coil system 300 will be more uniform in strength (i.e., magnitude) since it is located centrally below the speaker 128. This provides a magnetic field with more uniform magnitude.

In yet other embodiments, the HAC coil system 300 may not be aligned with respect to the speaker 128 (for example, if the speaker is offset due to space limitations), the ferrite core 310 may not be aligned with respect to the HAC coil system 300, or both. Such embodiments, while operable, may tend to increase left/right bias for the reasons described above. However, this left/right bias may serve to locate the peak magnitude signal away from sources of magnetic noise within the portable electronic device 100, thereby increasing the magnetic signal-to-noise ratio and allowing for a more optimal positioning of the portable electronic device 100 with respect to the user's ear. Misalignment of the ferrite core 310 with respect to the HAC coil system 300 would also reduce its amplifying effect. Misalignment of the ferrite core 310 with respect to the HAC coil system 300 may also reduce its amplifying effect. In spite of these considerations, such variations on placement of the coil or core may be useful in some implementations, and may be (for example) more useful than having no HAC system at all.

The central location of the speaker 128 and HAC coil system 300 may be advantageous in that it may provide some users with more freedom in regards to where the portable electronic device 100 is held during use. During normal use, for example during a voice call, the portable electronic device 100 is placed near the hearing aid 600 containing the T-coil (e.g., in or near the user's ear). However, the size, shape and wearing location of hearing aid devices vary and the location of the T-coil inside hearing aid devices vary. The speaker 128 and HAC coil system 300 may be located somewhere other than the centre of the PCB 304 in other embodiments.

The ferrite core 310 is positioned proximate to the HAC coil system 300 and speaker 128 to amplify the magnetic field generated by the HAC coil system 300. In the shown example, the ferrite core 310 is aligned with both the centre of the HAC coil system 300 and speaker 128 and located below both the HAC coil system 300 and speaker 128. Positioning the ferrite core 310 centrally below the HAC coil system 300 reduces the creation of left/right bias when amplifying the magnetic field generated by the HAC coil system 300 by uniformly amplifying the magnetic field since it is located centrally below the HAC coil system 300. In other embodiments, the ferrite core 310 may be positioned above the HAC coil system 300. In other embodiments, the HAC coils 308 may surround the ferrite core 310. Typically, the ferrite core 310 would be surrounded by the traces in a manner analogous to a spool of thread. Other configurations would likely be less effective in amplifying the magnetic field generated by the current in the traces.

In other embodiments, the ferrite core 310 may comprise a ferrite film or layer, or multiple ferrite films or layers. Each ferrite film is formed on a layer of the PCB 304 using suitable means including, but not limited to, deposition of the ferrite material on the layer(s).

As described above, the location of the HAC coil system 300 may be selected to improve the quality of the generated magnetic field by reducing the left-right bias of present in conventional HAC telephones which require the HAC coil to be placed in a position that is offset from the earpiece area and causes a left/right bias. The HAC coil systems described herein also address problems with conventional solutions, including a poor solder connection between the HAC coil and the PCB (poor electrical connection, not being firmly attached) and poor reliability due to thin wires and coatings used for soldering. Since the HAC coil is provided by HAC coil traces, the problems associated with soldering are eliminated.

The HAC coil systems described herein allow the number of HAC coil traces, the size of the HAC coil traces, the shape of the HAC coil traces, the configuration of the ferrite core 310, or any combination thereof may be selected to improve the magnetic signal. The magnetic signal may be generated to form a large area (or "sweet spot"), which provides the user with more freedom in regards to where the portable electronic device 100 is held during use. The portable electronic device 100 is placed near the hearing aid 600 containing the T-coil in use, however, the size, shape and wearing location of the hearing aid varies between device designs, and the location of the T-coil inside the hearing aid devices may vary. The magnetic signal may be generated to increase its magnitude of the magnetic field which is created, and thereby increase the distance at which the portable electronic device 100 can be held away from the user and hearing aid device.

Figure 4:
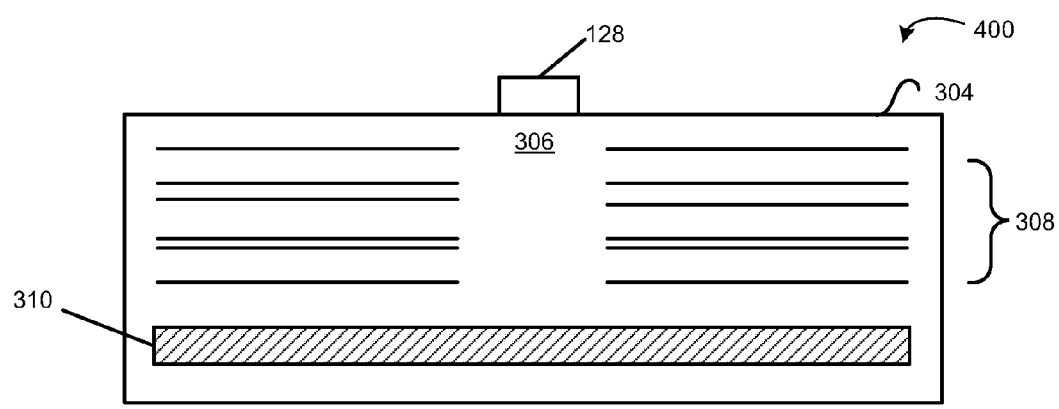
FIG. 4 is a sectional side view of a printed circuit board for the portable electronic device of FIG. 1 in accordance with another example embodiment of the present disclosure.

Referring now to FIG. 4, another example embodiment of a HAC coil system 400 for the portable electronic device 100 in accordance with the present disclosure will be described. The HAC coil system 400 is generally similar to the HAC coil system 300 of FIGS. 3A and 3B with the notable exception that the size of the HAC coils 308 is different. In the HAC coil system 300 of FIGS. 3A and 3B, the HAC coil system 300 occupies only a small portion of the PCB 304. The area unoccupied by the HAC coil system 300 is substantially large which may be advantageous for locating device components which are particularly sensitive to magnetic fields.

As noted above, the HAC coils 308 in the HAC coil system 300 are formed in circular shapes on multiple layers of the PCB 304. Each HAC coil 308 has a surface area which is substantially less than half of the total surface area of the layer in which it is located. In the shown example, the HAC coils 308 have a surface area which is approximately a quarter of the total surface area of the layer in which it is located. Other sizes are also possible.

In the HAC coil system 400 of FIG. 4, the HAC coil system 400 occupies a major portion of the PCB 304 (i.e., the cross-sectional area of the ferrite core and HAC coil each span a majority of the PCB 304). The area unoccupied by the HAC coil system 300 is substantially small. This increases the area ("sweet spot") from which the magnetic signal is generated, thereby increasing user freedom in regards to where the portable electronic device 100 is held during use. The ferrite core 310 is also much larger in the HAC coil system 400 to compliment the larger size of the HAC coil system 400. The ferrite core 310 in the shown example is typically the same size of the HAC coil system 400.

Figure 5:
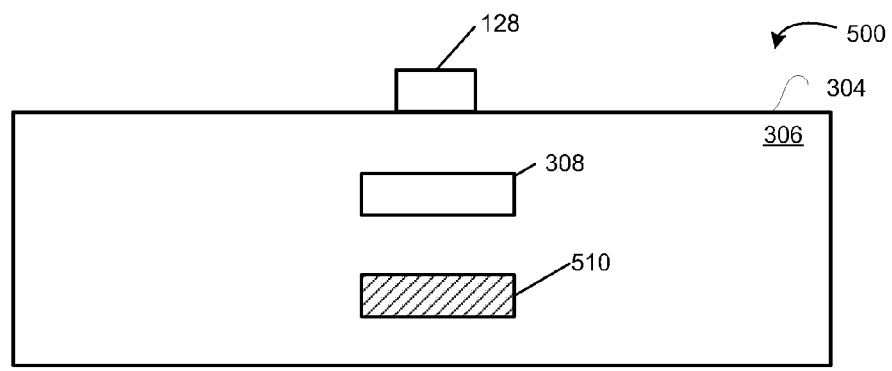
FIG. 5 is a sectional side view of a printed circuit board for the portable electronic device of FIG. 1 in accordance with a further example embodiment of the present disclosure.

Referring now to FIG. 5, a further example embodiment of a HAC coil system 500 for the portable electronic device 100 in accordance with the present disclosure will be described. In the HAC coil system 500, a conventional HAC coil 510 is used instead of HAC coil traces on layers of the PCB 304. The HAC coil 510 is formed in a multi-turn arrangement in which the HAC coil 308 is wound around a metal core. The HAC coil 510 may be, for example, an insulated copper wire wound around a core. The shape of the HAC coil 510 and the number of turns and/or layers of the HAC coil 510 may vary depending on the desired magnitude and orientation of the magnetic field. In other embodiments, the HAC coil system 500 may comprise HAC coil traces on layers of the PCB 304 as well as the conventional HAC coil 510.

The HAC coil 510 is embedded in a cavity (not shown) defined in the body 306. The cavity may be formed in the PCB 304 during the lamination process of its manufacture as described above, or may be mechanical drilled using depth controlled drilling techniques, laser drilled or otherwise formed in the surface of the PCB 304. The PCB 304 is manufactured such that electrical connectors of the HAC coil 510 may be electrically coupled to appropriate signal traces of the PCB 304. The cavity may also be used to embed the ferrite core 310 in the PCB 304.

Each of the described embodiments includes a ferrite core 310. However, the ferrite core 310 may be omitted in other embodiments. In such embodiments, other means may be used to amplify the magnetic field. For example, amplification of the magnetic signal may be achieved by increasing the number of the HAC coil traces (or turns of the conventional HAC coil 510), by increasing the size of the HAC coil traces (or turns of the conventional HAC coil 510), the shape of the HAC coil traces, or any combination thereof may be adjusted to improve the magnetic signal. These modifications may also provide other improvements to the magnetic field.

The resistance of the HAC coil systems may vary depending on the technology used to create the HAC coil and the details of the coil construction. In some examples, the HAC coil systems described herein have a resistance of at least 16 Ohms for use with the electronic circuitry of the portable electronic device 100 and so that the HAC coil system may be driven by the audio drive circuit 162. The resistance may be lowered to 8 Ohms or lower if an additional amplifier is provided in the audio drive circuit 162, depending on the amplifier. Some amplifier types, such as Class D amplifiers, may allow the resistance to be lowered even further. The proper resistance allows the HAC coil system not only to be driven but also to use as many loops (or turns) as possible to avoid wasting current due to a high resistance with only a few turns. The magnetic field that is generated by a cylindrical trace or coil of the HAC coil system is generally proportional to the number of loops (or turns) and the current along with the ferrite core characteristics, the measurement distance, etc.

A number of advantages may be realized by one or more of the embodiments of the concept. Certain regulatory bodies, such as the Federal Communications Commission (FCC), require or may soon require that mobile telephones have HAC. The concepts described herein may make compliance with regulations more feasible, and the feasibility may extend over a wide range of portable electronic devices of numerous configurations.

Even if regulatory influences are not taken into account, one or more embodiments may realize one or more benefits. Some of these potential advantages have been mentioned above. In addition to enabling benefits associated with HAC generally, one or more embodiments may save weight and volume, which may be especially desirable with devices sized to be held or carried in a human hand.

Further, although described in connection with interaction between a portable electronic device like a mobile telephone and a hearing aid, the concepts described herein are not necessarily limited to that context. For example, the concepts are not necessarily restricted to use with hearing aids. A magnetic signal may be generated by the coil, and the magnetic signal may be received or used by any other apparatus, such as an implantable medical device. Furthermore, the concepts are not restricted to conveying audio information. The signal need not be exclusively or partly audio, but may include, for example, numerical data or text.

The present disclosure may be embodied in other specific forms without departing from its spirit or essential characteristics. The described embodiments are to be considered in all respects as being only illustrative and not restrictive. The present disclosure intends to cover and embrace all suitable changes in technology. The scope of the present disclosure is, therefore, described by the appended claims rather than by the foregoing description. All changes that come within the meaning and range of equivalency of the claims are intended to be embraced within their scope.

The invention claimed is:

1. An electrical assembly, comprising:
   a printed circuit board (PCB) including a body comprised of multiple layers having at least one signal trace on one of the multiple layers;
   a hearing aid compatibility (HAC) coil located in the body of the PCB and electrically coupled to the at least one signal trace, wherein the HAC coil comprises one or more traces formed on one or more of the multiple layers of the body; and
   a ferrite core located in the body of the PCB for amplifying a magnetic field generated by the HAC coil, wherein the ferrite core has a cross-sectional area which is substantially the same or larger than a cross-sectional area of HAC coil.

2. The electrical assembly of claim 1 wherein the ferrite core is located proximate to the HAC coil to amplify the magnetic field generated by the HAC coil.

3. The electrical assembly of claim 1 further comprising a speaker mounted to a surface of the body.

4. The electrical assembly of claim 3 wherein the speaker is located in the centre of the PCB.

5. The electrical assembly of claim 3 wherein the ferrite core is located proximate to the HAC coil to amplify the magnetic field generated by the HAC coil, and wherein the ferrite core is located proximate to the speaker.

6. The electrical assembly of claim 3 wherein the ferrite core is located centrally below the HAC coil.

7. The electrical assembly of claim 3 wherein the ferrite core is located centrally below the HAC coil and the speaker.

8. The electrical assembly of claim 3 wherein the HAC coil surrounds the ferrite core.

9. The electrical assembly of claim 3 further comprising an audio drive circuit for concurrently driving the HAC coil and the speaker.

10. The electrical assembly of claim 1 wherein the ferrite core comprises a ferrite film formed on one or more of the multiple layers of the body.

11. The electrical assembly of claim 1 wherein the ferrite core and HAC coil each have a cross-sectional area of approximately 4 mm.

12. The electrical assembly of claim 1 wherein the ferrite core and HAC coil each have a cross-sectional area which spans a majority of the PCB.

13. The electrical assembly of claim 1 wherein the HAC coil is a conventional HAC coil.

14. The electrical assembly of claim 13 wherein the body is comprised of multiple layers and the ferrite core comprises a ferrite film formed on one or more of the multiple layers of the body.

15. The electrical assembly of claim 1 wherein the ferrite core is a ceramic material having a cubic crystalline structure with the chemical formula $MO.Fe_2O_3$ where MO refers to a combination of two or more divalent metal oxides selected from the alternatives of ZnO, NiO, MnO and CuO.

16. A portable electronic device, comprising:
an electrical assembly comprising:
a printed circuit board (PCB) including a body comprised of multiple layers having at least one signal trace on one of the multiple layers;
a hearing aid compatibility (HAC) coil located in the body of the PCB and electrically coupled to the at least one signal trace, wherein the HAC coil comprises one or more traces formed on one or more of the multiple layers of the body; and
a ferrite core located in the body of the PCB for amplifying a magnetic field generated by the HAC coil, wherein the ferrite core has a cross-sectional area which is substantially the same or larger than a cross-sectional area of HAC coil; and
a processor, input device and an output device each electrically coupled to the electrical assembly.

17. The portable electronic device of claim 16 wherein the HAC coil is configured for receiving an electric audio signal from the processor, and generating a magnetic audio signal which corresponds to the electric audio signal received from the processor.

18. The portable electronic device of claim 16 further comprising a communication subsystem configured to facilitate wireless transfer of audio signals containing audio over a wireless network.

19. The portable electronic device of claim 16 further comprising a housing defining an opening, and a boot for acoustically porting sound from the speaker through the opening in the housing to an environment external to the portable electronic device.

20. An electrical assembly, comprising:
a printed circuit board (PCB) including a body having at least one signal trace;
a speaker mounted to a surface of the body of the PCB;
a hearing aid compatibility (HAC) coil located in the body of the PCB and electrically coupled to the at least one signal trace, wherein the HAC coil is located centrally below the speaker; and
a ferrite core located in the body of the PCB for amplifying a magnetic field generated by the HAC coil, wherein the ferrite core is located centrally below the speaker, wherein the ferrite core has a cross-sectional area which is substantially the same or larger than a cross-sectional area of HAC coil.

21. The electrical assembly of claim 20 wherein the body of the PCB is comprised of multiple layers and the HAC coil comprises one or more traces formed on one or more of the multiple layers of the body.

22. The electrical assembly of claim 20 wherein the ferrite core comprises a ferrite film formed on one or more of the multiple layers of the body.

23. The electrical assembly of claim 20 wherein the ferrite core and HAC coil each have a cross-sectional area of approximately 4 mm.

24. The electrical assembly of claim 20 wherein the ferrite core and HAC coil each have a cross-sectional area which spans a majority of the PCB.

25. The electrical assembly of claim 20 wherein the ferrite core is a ceramic material having a cubic crystalline structure with the chemical formula $MO.Fe_2O_3$ where MO refers to a combination of two or more divalent metal oxides selected from the alternatives of ZnO, NiO, MnO and CuO.

26. A portable electronic device, comprising:
an electrical assembly comprising:
a printed circuit board (PCB) including a body having at least one signal trace;
a speaker mounted to a surface of the body of the PCB;
a hearing aid compatibility (HAC) coil located in the body of the PCB and electrically coupled to the at least one signal trace, wherein the HAC coil is located centrally below the speaker; and
a ferrite core located in the body of the PCB for amplifying a magnetic field generated by the HAC coil, wherein the ferrite core is located centrally below the speaker, wherein the ferrite core has a cross-sectional area which is substantially the same or larger than a cross-sectional area of HAC coil; and
a processor, input device and an output device each electrically coupled to the electrical assembly.

27. The portable electronic device of claim 26 wherein the HAC coil is configured for receiving an electric audio signal from the processor, and generating a magnetic audio signal which corresponds to the electric audio signal received from the processor.

28. The portable electronic device of claim 26 further comprising a communication subsystem configured to facilitate wireless transfer of audio signals containing audio over a wireless network.

* * * * *